United States Patent
Dharmarajan

(10) Patent No.: US 7,493,493 B2
(45) Date of Patent: Feb. 17, 2009

(54) METHOD AND APPARATUS FOR PASSWORD GENERATION

(75) Inventor: Manjeri Ramanathan Dharmarajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 10/734,846

(22) Filed: Dec. 12, 2003

(65) Prior Publication Data

US 2005/0132203 A1 Jun. 16, 2005

(51) Int. Cl.
*G06F 12/14* (2006.01)
(52) U.S. Cl. .................................................. 713/184
(58) Field of Classification Search .................. 713/184
See application file for complete search history.

(56) References Cited

U.S. PATENT DOCUMENTS 5,544,255 A * 8/1996 Smithies et al. ............. 382/119
5,592,553 A * 1/1997 Guski et al. ................. 713/159

* cited by examiner

*Primary Examiner*—Gilberto Barron, Jr.
*Assistant Examiner*—Devin Almeida
(74) *Attorney, Agent, or Firm*—Anthony England; William Steinberg

(57) ABSTRACT

The generation of a unique password using a secret key and an application name is disclosed. Other passwords may be generated for other applications using the same key. A user provides a key that is not easily able to be guessed by third parties. The user also inputs a name of an application for which a password is desired. The system utilises the application name and the secret key to generate a unique password for that application, using standard encryption techniques. The system generates the same password for that application and secret key combination every time. Alternate embodiments generate a user identifier from the same secret key and application name.

9 Claims, 4 Drawing Sheets

METHOD AND APPARATUS FOR PASSWORD GENERATION

FIELD OF THE INVENTION

The present invention relates generally to security systems and, in particular, to generating passwords for use in multiple applications.

BACKGROUND

In modern society, a person typically has many accounts to access different applications, including banking, email, websites, and databases. Each of these applications requires the user to enter a password. The password, in combination with a user name, identifies the user and provides the user with access to information that is relevant to that user. Typically, a user is not able to access information relating to a different user, particularly in banking and other financial applications. Some websites allow a user to view, but not modify, a directory of another user.

Different applications impose different requirements and restrictions on passwords. Passwords typically consist of alphanumeric characters, but different applications may require a different number of characters or the inclusion of at least one number. It is prudent not to use as a password any personal information that might be readily obtained or guessed. Such information includes birthdays and names.

As a user typically has many passwords, each of which may have different parameters and lengths, it is difficult for the user to remember all of the passwords. It is also difficult to recall the application to which a given password corresponds. It is generally not advisable to use the same password for all applications, because the password rules may differ for different applications. Further, using the same password for a bank account and a frequent flyer account, for example, provides the airline, or an employee thereof, with the means to access confidential banking details of the user.

If a single password is used for multiple applications, compromising one password can compromise accounts on all other applications. Recording passwords is both cumbersome and a security risk. If a written record of passwords and corresponding applications is lost or stolen, the consequences may be disastrous for the user concerned.

Some companies offer a service to validate a user at all websites on the Internet via a single password. Such systems cost money and may not be entirely trustworthy. In such systems, a validated user accesses an intermediary website using a single password. That website then validates the user at all other websites.

Thus, a need exists for a method of generating passwords for multiple applications using a single key.

SUMMARY

Disclosed are arrangements which seek to overcome substantially, or at least ameliorate, one or more of the above problems by generating unique passwords for different applications using a single key. A user provides a key that is not easily able to be guessed by third parties. The user also inputs a name of an application for which a password is desired. The system utilises the application name and the secret key to generate a unique password for that application, using standard encryption techniques. The system generates the same password for that application name and secret key combination every time. Alternate embodiments generate a user identifier from the same secret key and application name.

According to a first aspect of the present disclosure, there is provided a method for generating a password using a key and an application name. The method comprises the steps of receiving an input key and an input application name for which a password is desired. A password is generated using the input key and the input application name. Optionally, a user identifier is generated for use with the application. A second password can be generated for a second application using the same input key and the second application name.

According to a second aspect of the present disclosure, there is provided a method of generating a password for a plurality of applications using a single key. The method comprises the steps of receiving a single key, and a first application name associated with a first application. The method generates a first password for the first application, based on at least the single key and the first application name. Further, the method receives a second application name associated with a second application, and generates a second password for the second application, based on at least the single key and the second application name.

According to a third aspect of the invention, there is provided an apparatus for generating a password for at least one application using a single key. The apparatus comprises a device for receiving the single key, a device for receiving a first application name associated with a first application, and a device for generating a first password for the first application, based on at least the single key and the first application name.

According to a fourth aspect of the invention, there is provided a computer program product comprising a computer readable medium having a computer program recorded therein for generating a password for at least one application using a single key. The computer program comprises computer program code means for receiving the single key, computer program code means for receiving a first application name associated with a first application, and computer program code means for generating a first password for the first application, based on at least the single key and the first application name.

Other aspects of the invention are also disclosed.

BRIEF DESCRIPTION OF THE DRAWINGS

One or more embodiments of the present invention are described with reference to the drawings and appendix, in which.

DETAILED DESCRIPTION

Overview

In accordance with an embodiment of the present invention, there is provided a method and a system for generating a unique password using a secret key and an application name. Other passwords may be generated for other applications using the same key. A user provides a key that is not easily able to be guessed by third parties. The user also inputs a name of an application for which a password is desired. The system utilises the application name and the secret key to generate a unique password for that application, using standard encryption techniques. The system generates the same password for that application and secret key combination every time. The system is configured to ensure that knowing one password will not make it easy to determine the secret key or, indeed, another password.

The method and system of the invention may optionally generate a unique user identifier for each application. This improves security and is useful in situations in which an application is unable to allocate a desired user identifier of choice. The method and system of the invention may also be configured to specify rules for the password for nominal applications. For example, passwords may have to begin with a letter or contain only numerals, depending on the application.

Specific Embodiments

Figure 1:
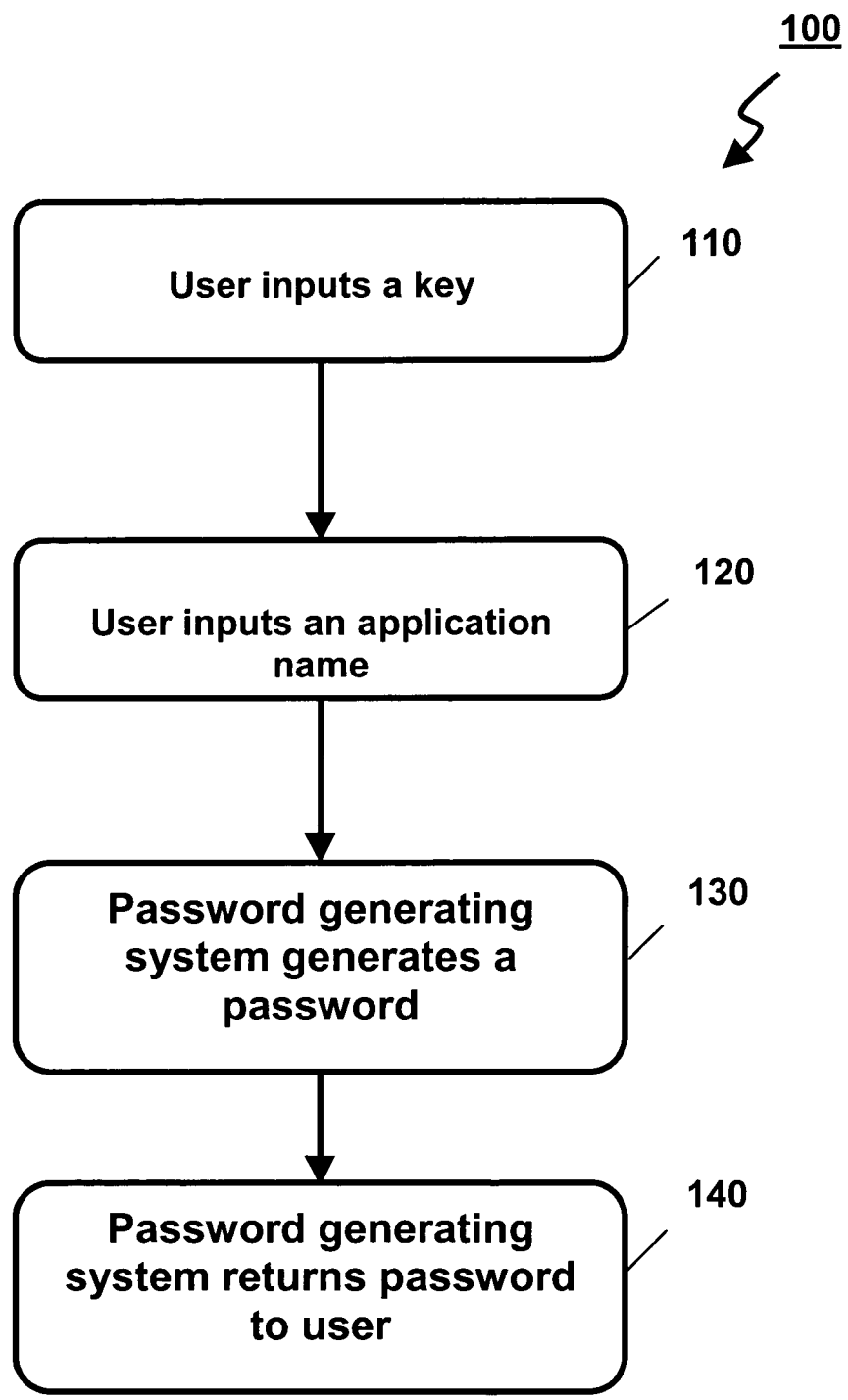
FIG. 1 is a flow diagram of a method for generating a password using a single key and an application name.

FIG. 1 is a flow diagram 100 of the method of the invention. In step 110, a user inputs a key to a password generating system. In step 120, the user inputs an application name for which a password is desired. The application name can be, for example, a name of a bank, an Internet address, or a company name. The application name can also be, for example, a generic name for the application under consideration. Thus, the application name input by a user can be, for example, "email", or "bank". Control passes to step 130, in which the password generating system uses standard encryption techniques to generate a password, based on the key and the application name provided. Such standard encryption techniques include, for example, International Data Encryption Algorithm (IDEA), BLOWFISH, Software-optimized Encryption Algorithm (SEAL), RC4, Data Encryption Standard (DES) and RSA. Some pre-processing of the key and application name may be necessary or desirable to present information in an acceptable format for a particular encryption technique. Such pre-processing may include, for example, concatenating the key and application name to form a text string for processing using Block Addition encryption. In a final step 140, the password is returned to the user.

Figure 2:
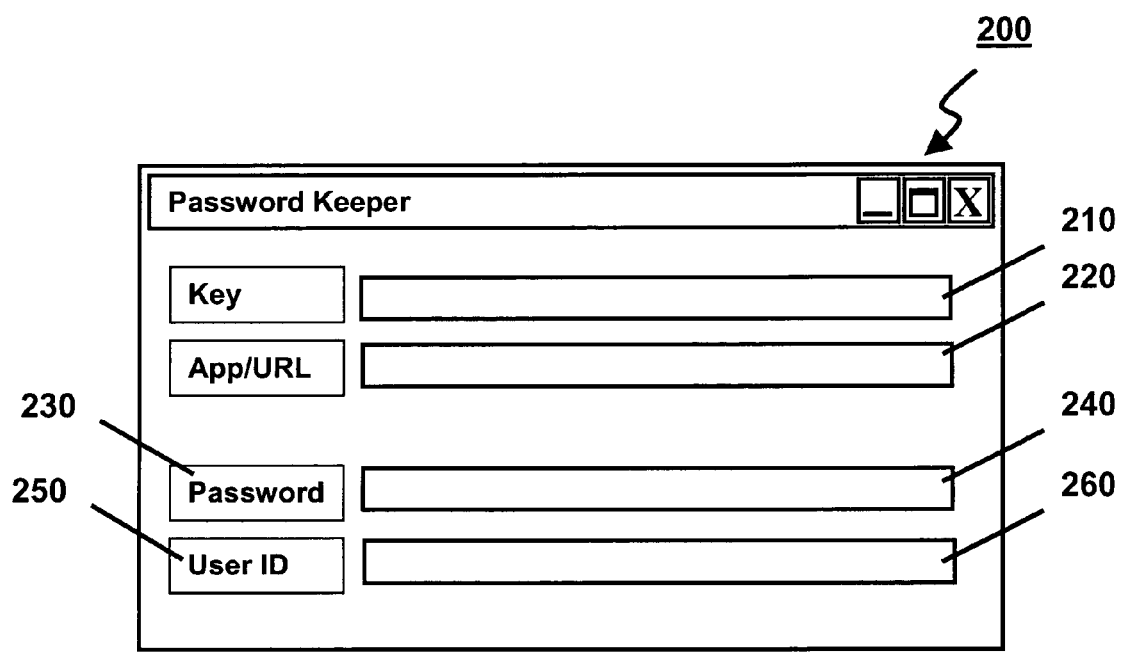
FIG. 2 is a user interface to a computer system for generating a password using a single key and an application name.

FIG. 2 is a user interface 200 to a computer system embodying the invention. A key field 210 provides a field for a user to input a unique key. Similarly, an application field 220 provides a field for a user to input an application name for which a password is desired. When a user presses a password button 230, the system returns in password field 240 a password generated by the system, based on the unique key and the application name.

In one embodiment, the key and the application name are concatenated to form a text string. Block addition is then performed on the text string to produce a password based on the key and the application name. In another embodiment, a user provides a numeric key. Each letter of the application name is shifted right by the corresponding digit of the key to obtain a password based on the key and the application name. Thus, if the user enters the key 12345 and the application name LOTUS, the resultant password is MQWYX.

The embodiment shown in FIG. 2 features an optional user identifier button 250. When a user pushes the user identifier button 250, the system returns in a user identifier field 260 a user identifier generated by the system, based on the unique key and the application name. The same encryption technique can be used to generate a password and a user identifier from the key and application name. In the example above in which the key and application name are concatenated before performing block addition to generate a password, the key and application name can be concatenated in the reverse order before performing block addition to generate a user id. In the second example above in which the application name was right-shifted by the corresponding digit of the key to obtain a password, the user id can be generated by left-shifting the application name by the corresponding digit of the key. Alternatively, different encryption techniques can be used to generate a password and user identifier from a key and application name. It will be appreciated by a person skilled in the art that many different methods and variations of utilising the key and the application name to generate a password and user id may be practised, without departing from the scope and spirit of the invention.

In the following example, a user wishes to generate a password for accessing the Internet website www.yahoo.com, using a secret key "123456". The user enters the key "123456" into the key field 210 and the application name "www.yahoo.com" into the application field 220. The user then presses the password button 230. The computer system embodying the invention invokes a standard encryption technique to generate the password. In this example, the standard encryption technique is Block Addition encryption. The computing system concatenates the key and the application name to form the text to be encrypted, "www.yahoo.com123456". The computing system forwards the expression "Password" to the Block Addition algorithm to be used as an initial result value. The Block Addition encryption technique adds eight characters at a time from the text to be encrypted, "www.yahoo.com123456", to the initial result, "Password", to produce an encrypted password "mX>Vc$I'".

In an alternate embodiment, the user is able to specify a time period for which the password is to be valid. If the user indicates that the password is to be valid for the second six month period of the year 2003, the computing system sends the value "Password2H2003" to the Block Addition encryption to be used as the initial result. That particular combination of key, application name, and time period generates the same password at any time during the period 1 Jun. 2003 to 31 Dec. 2003. It will be obvious to a person skilled in the art that many variations are possible without departing from the spirit and scope of the invention. For example, the initial result string for the same time period can be "Password20033Q4Q". Alternatively, the time period can be concatenated to the text to be encrypted.

If the user also wishes to generate a user identifier, the user presses the user identifier button 250. In this embodiment, the user identifier is 7 characters long. The computing system concatenates the key and the application name to form the text string "123456www.yahoo.com" to be encrypted. The string "User ID" is presented to the encryption technique as an initial result value. The Block Addition encryption technique in this example adds the text 7 characters at a time to the initial result to generate the user identifier "uL#_D?6".

In a further embodiment, the user specifies the length of the password and user identifier to be generated. In such cases, the embodiment may have to modify a password or user identifier generated by the encryption techniques, before returning the results to the user.

In a yet further embodiment, the user specifies a template for a password or user identifier to be generated. For example, a user named John Doe wishes to generate an eight character user identifier beginning with JDoe. The user enters the template JDoe???? and the embodiment of the invention presents the string "123456www.yahoo.com" as the text to be encrypted and the string "User" as the initial result value.

Block Addition adds the text four characters at a time to the initial result to generate the four character user identifier suffix "uL#7". The user identifier suffix is inserted into the template to generate a returned User ID "JDoeuL#7".

Figure 3:
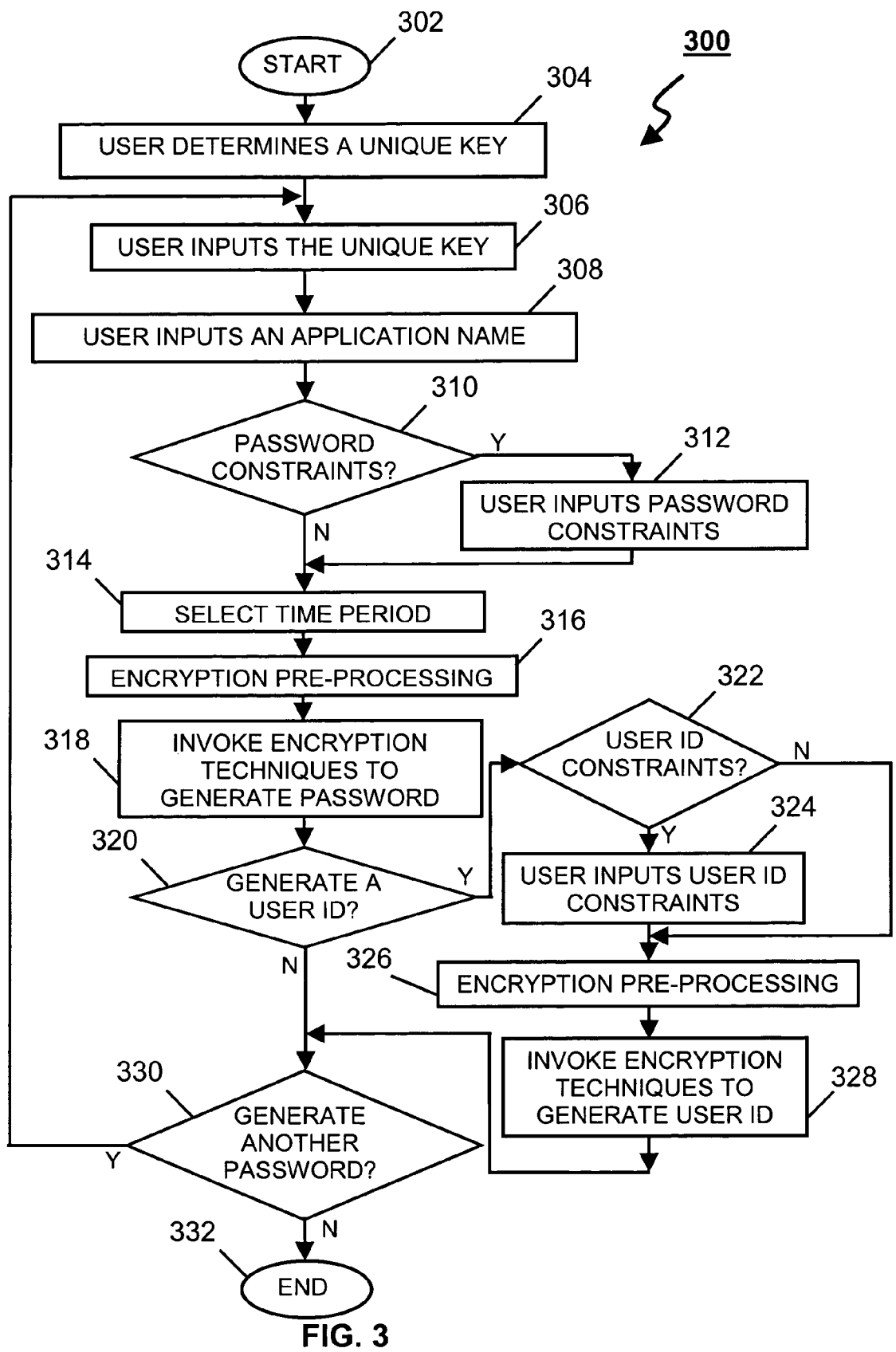
FIG. 3 is a flow diagram of a method for generating passwords using a single key and an application name.

FIG. 3 is a flow diagram of a method for generating passwords using a single key and an application name in accordance with an embodiment of the invention. In this embodiment, a user can select a time period for which a generated password is valid. A user can also request a user identifier. For this example, a user wishes to generate passwords for: (i) an email account provided on the Internet website www.hotmail.com; and (ii) an Internet banking account. The process starts at step 302 and proceeds to step 304 in which a user determines a unique key to be used for generating passwords. As described above in respect of passwords, it is prudent not to use any personal information that might be readily obtained or guessed as a unique key. In this example, the user selects the unique key "gromit27".

The user inputs the unique key in step 306 and in the following step 308, the user inputs the name of an application for which a password is desired. In this example, the user enters "hotmail". Step 310 is a decision box in which the user indicates if there are any password constraints. In the case of Hotmail, passwords must be at least six characters long. Accordingly, the answer at step 310 is Yes and control passes to step 312 in which the user inputs the password constraints. Such constraints may include a minimum password length and a maximum password length. The constraints may also include whether capital letters, numbers and non-alphanumeric characters are allowed. In this example, the user indicates that the minimum password length is six characters long and for ease of use, the user selects a maximum password length of 6 characters.

The manner in which the password constraints are input may include a number of dialog boxes, drop down lists, and radio buttons associated with different parameters. In this example, the user provides a template for the password to be generated. In this template, the number 9 represents numbers, A represents letters, N represents alphanumeric characters, L represents lower case letters, U represents upper case letters and M represents printable characters. Thus, for a password requiring 6 alphanumeric characters, the user inputs NNNNNN as the password format. A password that must begin with a letter, finish with a number, and have a total of 8 characters is represented as AMMMMMM9.

Control then passes from step 312 to step 314, in which the user indicates whether there is a time period associated with the password. At step 310, if there are no password constraints, the answer is No, and control bypasses step 312 and proceeds directly to step 314. In step 314, the user is presented with radio buttons indicating whether the password to be generated is valid for a month, quarter, half-year, or year. There is also an option to indicate that the life of the password does not have a time constraint. These time periods are merely to illustrate the nature of the invention and a person skilled in the art will appreciate that other time periods and methods for presenting and selecting those time periods are possible without departing from the spirit and scope of the invention. Further, associating a time period with a password is optional and may be omitted from other embodiments of the invention.

In this example, there is no time period associated with the validity of a Hotmail password, so the user selects the appropriate radio button. Control passes to step 316 in which encryption pre-processing is performed. Depending on the encryption technique utilised for generating a password, it may be necessary to process the key and application name to present the encryption technique with appropriate data. As described above in respect of an example using Block Addition encryption, pre-processing involved concatenating the key and application name. Other encryption techniques require as inputs the text to be encrypted and an initial result. If different techniques are used for generating passwords and user identifiers, the encryption pre-processing may include activating a desired encryption technique. In this example, the application name and key are concatenated to form the text string "hotmailgromit27". "Password" is set as an initial result.

In the next step 318, standard encryption techniques are invoked to generate a password. In this example, Block Addition encryption acts on "hotmailgromit27", using "Password" as an initial result, to generate a password based on the secret key and application name. Control passes to decision step 320, which asks whether the user wishes for a userid to be generated. If no userid is required, the answer is No and control passes to decision step 330. If a userid is required at step 320, the answer is Yes and control passes to a further decision step 322; which determines whether there are constraints associated with the userid to be generated. If there are no userid constraints, the answer is No and control passes to step 326. However, if there are userid constraints, the answer at step 322 is Yes, and control passes to step 324, in which the user inputs the userid constraints in a manner similar to that described above in step 312 in respect of the password constraints. Again, there are many ways in which such constraints may be provided, without departing from the spirit and scope of the invention.

Control proceeds to step 326, which performs encryption pre-processing. As described above in respect of step 316, it may be necessary to modify the key and application name to present suitable data to an encryption technique to generate a user identifier. When using the same encryption technique to generate a password and user identifier for the same key and application name, the encryption pre-processing ensures that the encryption technique acts on different data when generating the password and user identifier, so that the password and user identifier are not the same. In this example, the encryption pre-processing in step 326 concatenates the key and application name to form "hotmailgromit27" and the initial result is set to "User Id".

Control passes to step 328 which invokes encryption techniques to generate a userid, based on the secret key and application name. In this example, Block Addition is performed to generate a user identifier. After the userid is generated in step 328, control flows to step 330.

In decision step 330, the user is asked whether a further password is to be generated. If the answer is Yes, control returns to step 306. If the user does not want a further password to be generated, the answer at step 330 is No and the process terminates at step 332. In this example, the user wishes to generate a second password to be used for online Internet banking. In step 306, the user inputs the unique key "gromit27". In the next step 308, the user inputs the name of the bank, which in this example is BankXYZ. Control passes to step 310, which determines whether there are password constraints for this application. In this case, there are no constraints for passwords used for Internet banking at BankXYZ, so the answer is No and control passes to step 314.

Passwords for Internet banking at BankXYZ must be changed annually. Accordingly, at step 314 the user selects the radio button corresponding to a password valid for the current year 2003. Control passes to step 316 and encryption pre-processing is performed. In this case, the key "gromit27", the application name "BankXYZ", and the year "2003" are concatenated to form the string "gromit27BankXYZ2003" to be encrypted. "Password" is set as an initial result.

In step 318, standard encryption techniques are used to generate a password and control proceeds to step 320. No userid is required in this instance, so the answer at step 320 is No and control proceeds to step 330. As there are no further passwords to be generated, the answer at step 330 is No and the process terminates at step 332. Thus, passwords for different applications are generated, based on the application names and a single user key.

As another example, user A contributes to several discussion fora. Each forum requires user A to authenticate before posting to that forum, so user A has a login username and a corresponding password for each forum. User A previously stored the passwords and login usernames in a file on a laptop computer.

User A opens a website www.ForumA.com in a browser window. The www.ForumA.com website prompts User A for a username and password. User A executes in a second window an application "Password Keeper" embodying the invention. User A enters a secret key to the Password Keeper application. User A also copies the Forum A Uniform Resource Locator (URL) from the browser window and pastes the Forum A URL in an App/URL text box field on the Password Keeper application. User A presses a Password button on the Password Keeper interface and the Password Keeper application uses encryption techniques to generate a password based on the key and application name. User A copies the generated password to the Forum A login page and is authenticated by that website. Rather than remembering the password for Forum A and other fora to which User A subscribes, User A need only remember the secret key. The Password Keeper embodying the invention generates the same password every time for the secret key/application name combination.

As a further example, User B is a recruitment consultant who uses Internet messaging to communicate with prospective candidates and employers. User B subscribes to many Internet messaging services, including Yahoo Messenger, I Seek You Chat (ICQ), and The Microsoft Network (MSN). Each of these messaging services requires a login username and a corresponding password of varying format.

User B receives a resume from a new candidate and notices a reference to a new messaging service called XYZ Messenger. User B decides to subscribe to XYZ Messenger and accesses the XYZ Messenger website, www.xyzmessenger.com. The XYZ Messenger website asks for a username and password to establish a new account. User B executes Password Keeper in a separate window and enters a secret key. User B enters www.xyzmessenger.com into an App/URL text box field on the Password Keeper application. User B then presses a Password button and a User ID button on the Password Keeper interface. The Password Keeper application generates a password and an associated username, based on the secret key and the application name. User B provides each of the generated password and username to the XYZ Messenger new account web page and XYZ Messenger creates a new account for User B. When User B accesses any of the subscribed Internet messaging services, User B executes Password Keeper and enters a secret key and an appropriate application name to generate a password for that application. Thus, User B need only remember a single secret key, rather than login names and passwords for the various messaging services.

In an alternative embodiment, a password generator associates a time period with a generated password. The time period determines the time for which that password is valid.

In one scenario, passwords for a database are valid for three months. The password generator includes an additional field corresponding to a current quarter, such as 2003Q3, in the generation of passwords for that database. Every quarter, passwords generated by the password generator are different. Employing an additional field that varies with time ensures that a user does not have to change a secret key for passwords having limited lifespans.

If a password generated by a password generator embodying the invention is compromised, the user must change the secret key and change all passwords based on the key associated with the compromised password.

The principles of the preferred method described herein have general applicability to password security systems. However, for ease of explanation, the steps of the preferred method are described with reference to computer passwords. However, it is not intended that the present invention be limited to the described method. For example, the invention may have application to bank accounts, databases and frequent flyer accounts.

The aforementioned preferred method(s) comprise a particular control flow. There are many other variants of the preferred method(s) which use different control flows without departing from the spirit or scope of the invention. Furthermore, one or more of the steps of the preferred method(s) may be performed in parallel, rather than sequentially.

Computer Implementation

The method for generating unique passwords for multiple applications using a single key may be implemented in modules. A module, and in particular its functionality, can be implemented in either hardware or software. In the software sense, a module is a process, program, or portion thereof, that usually performs a particular function or related functions. Such software may be implemented in Java, C, C++, Fortran, for example, but may be implemented in any of a number of other programming languages/systems, or combinations thereof. An example of software code embodying the invention is shown in Appendix A.

In the hardware sense, a module is a functional hardware unit designed for use with other components or modules. For example, a module may be implemented using discrete electronic components, or it can form a portion of an entire electronic circuit such as a Field Programmable Gate Array (FPGA), Application Specific Integrated Circuit (ASIC), and the like. A physical implementation may also include configuration data for a FPGA, or a layout for an ASIC, for example. Still further, the description of a physical implementation may be in EDIF netlisting language, structural VHDL, structural Verilog or the like. Numerous other possibilities exist. Those skilled in the art will appreciate that the system can also be implemented as a combination of hardware and software modules.

In addition, the present invention also implicitly discloses a computer program, in that it would be apparent to the person skilled in the art that the individual steps of the preferred method described herein are to be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing the spirit or scope of the invention. Furthermore one or more of the steps of the computer program may be performed in parallel rather than sequentially.

Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

Figure 4:
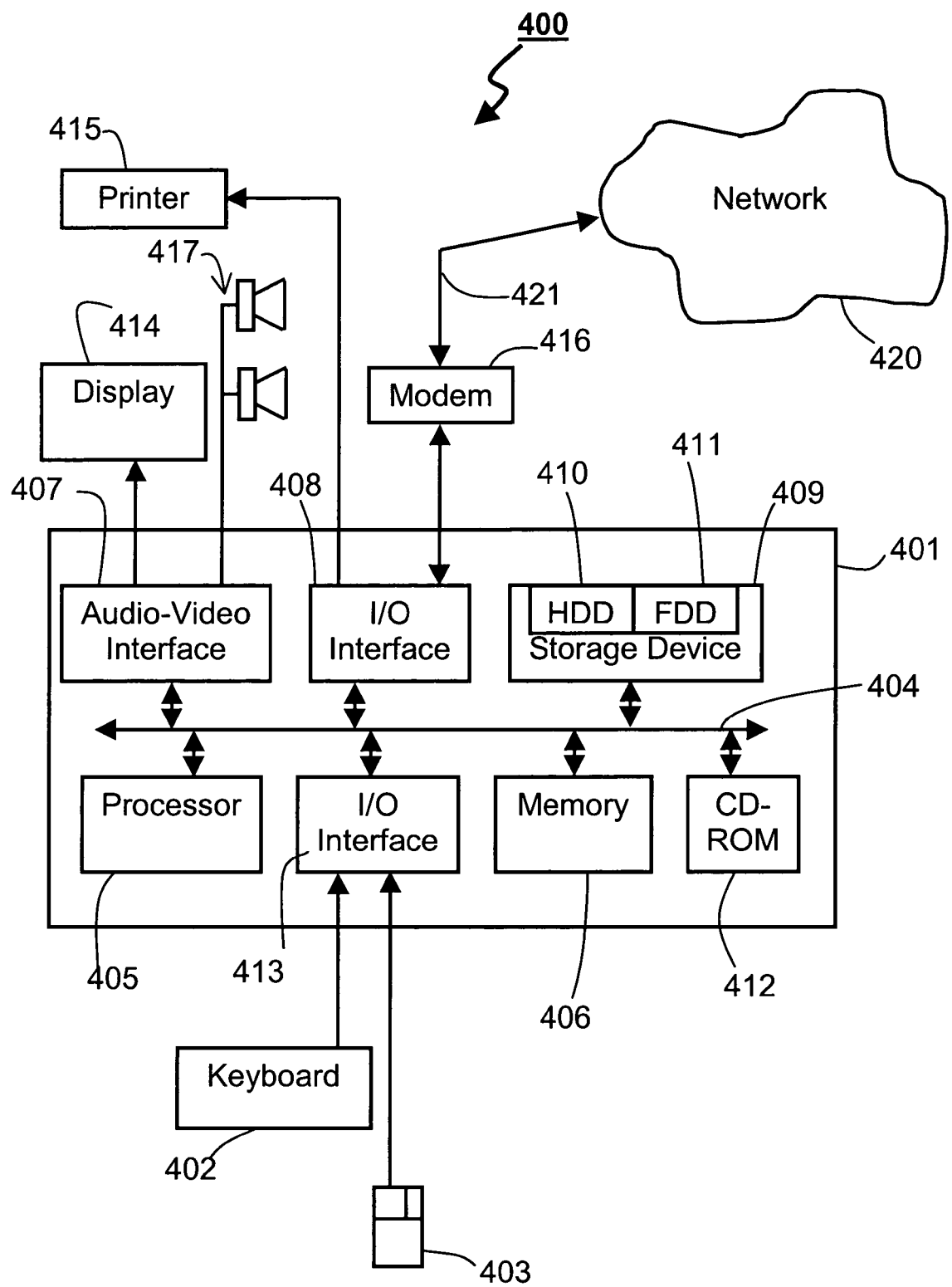
FIG. 4 is a schematic block diagram of a general purpose computer upon which arrangements described can be practised; and Appendix A is a representation of software for performing the method of FIG. 1.

The method of generating passwords for multiple applications using a single key is preferably practised using a general-purpose computer system 400, such as that shown in FIG. 4, wherein the processes of FIG. 1 may be implemented as software, such as an application program executing within the computer system 400. In particular, the steps of the method of generating a password using a single key and an application name are effected by instructions in the software that are carried out by the computer. The instructions may be formed as one or more code modules, each for performing one or more particular tasks. The software may also be divided into two separate parts, in which a first part performs the password generation methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for password generation.

The computer system 400 is formed by a computer module 401, input devices such as a keyboard 402 and mouse 403, output devices including a printer 415, a display device 414 and loudspeakers 417. A Modulator-Demodulator (Modem) transceiver device 416 is used by the computer module 401 for communicating to and from a communications network 420, for example connectable via a telephone line 421 or other functional medium. The modem 416 can be used to obtain access to the Internet, and other network systems, such as a Local Area Network (LAN) or a Wide Area Network (WAN), and may be incorporated into the computer module 401 in some implementations.

The computer module 401 typically includes at least one processor unit 405, and a memory unit 406, for example formed from semiconductor random access memory (RAM) and read only memory (ROM). The module 401 also includes a number of input/output (I/O) interfaces including an audio-video interface 407 that couples to the video display 414 and loudspeakers 417, an I/O interface 413 for the keyboard 402 and mouse 403 and optionally a joystick (not illustrated), and an interface 408 for the modem 416 and printer 415. In some implementations, the modem 416 may be incorporated within the computer module 401, for example within the interface 408. A storage device 409 is provided and typically includes a hard disk drive 410 and a floppy disk drive 411. A magnetic tape drive (not illustrated) may also be used. A CD-ROM drive 412 is typically provided as a non-volatile source of data. The components 405 to 413 of the computer module 401, typically communicate via an interconnected bus 404 and in a manner which results in a conventional mode of operation of the computer system 400 known to those in the relevant art. Examples of computers on which the described arrangements can be practised include IBM-PC's and compatibles, Sun Sparcstations or alike computer systems evolved therefrom.

Typically, the application program is resident on the hard disk drive 410 and read and controlled in its execution by the processor 405. Intermediate storage of the program and any data fetched from the network 420 may be accomplished using the semiconductor memory 406, possibly in concert with the hard disk drive 410. In some instances, the application program may be supplied to the user encoded on a CD-ROM or floppy disk and read via the corresponding drive 412 or 411, or alternatively may be read by the user from the network 420 via the modem device 416. Still further, the software can also be loaded into the computer system 400 from other computer readable media. The term "computer readable medium" as used herein refers to any storage or transmission medium that participates in providing instructions and/or data to the computer system 400 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 401. Examples of transmission media include radio or infrared transmission channels as well as a network connection to another computer or networked device, and the Internet or Intranets including e-mail transmissions and information recorded on Websites and the like.

The method of generating unique passwords for multiple applications using a single password may alternatively be implemented in dedicated hardware such as one or more integrated circuits performing the functions or sub functions of password generation. Such dedicated hardware may include graphic processors, digital signal processors, or one or more microprocessors and associated memories.

CONCLUSION

It is apparent from the above that the arrangements described are applicable to the security, banking and computer industries.

The foregoing describes only some embodiments of the present invention, and modifications and/or changes can be made thereto without departing from the scope and spirit of the invention, the embodiments being illustrative and not restrictive.

APPENDIX A

::::::::::::::::::::::::::::::::::::: key.java :::::::::::::::::::::::::::::::::::::::::::::::::::::::

```
/**
    @author dharma
 *
    This implements a simple encryption scheme.
    It is initialized with a key. Then it can use it and an app name
    to generate a password and user id for that app.
```

APPENDIX A-continued

```java
*/
public class Key {
private String strKey;
    static char Ascii[ ] = {
'a', 'b', 'c', 'd', 'e', 'f', 'g', 'h',
'i', 'j', 'k', 'l', 'm', 'n', 'o', 'p', 'q',
'r', 's', 't', 'u', 'v', 'w', 'x', 'y', 'z',
'1', '2', '3', '4', '5', '6', '7', '8', '9',
'0', 'A', 'B', 'C', 'D', 'E', 'F', 'G', 'H',
'I', 'J', 'K', 'L', 'M', 'N', 'O', 'P', 'Q',
'R', 'S', 'T', 'U', 'V', 'W', 'X', 'Y', 'Z',
                            '_', '-', '=', '+', '}', '(', '*', '&', '^',
                            '%', '$', '#', '@', '!', '~', '"', '/', '?',
                            '\'', ';', ':', '"', ',', '.', '\\', '|',
                            '{', '}', '[', ']', '<', '>'
                        );
    private char itoc(int i) {
    return Ascii[i % Ascii.length];
    }
    /**
    This adds up the chars in s l at a time and returns a
    string l chars long. It initializes the sum with initStr.
    l is the length of initStr.
    s HAS to be longer than initStr.
    */
    private String add(String s, String initStr) {
    StringBuffer sumStr = new StringBuffer(initStr);
    int numSets, setLen, shift;
        /**
    First process all sets.
        */
setLen = initStr.length( );
numSets = s.length( )/setLen;
for( int set = 0; set < numSets; set++) {
    for( int i = 0; i < setLen; i++) {
sumStr.setCharAt(i, itoc(sumStr.charAt(i) +
s.charAt(setLen*set + i)));
        }
    }
// Process the balance
shift = 0;
for( int i = setLen*numSets; i < s.length( ); i++) {
    sumStr.setCharAt(shift, itoc(sumStr.charAt(shift) + s.charAt(i)));
    shift++;
    }
    return sumStr.toString( );
    }
    public Key(String s) {
    strKey = s;
    }
    /**
    This uses the key and app to create a password
    */
    public String password(String app) {
    return add(app + strKey, "Password");
    }
    /**
    This uses the key and app to create a user id
    */
    public String userid(String app) {
    return add(strKey + app, "User ID");
    }
}
:::::::::::::::::::::::::::::::::: passwordkeeper.java :::::::::::::::::::::::::::::::::::::::::::::::::::::::::
import javax.swing.*;
import java.awt.*;
import java.awt.event.*;
import Key;
/**
    @author dharma
    *
    To change this generated comment edit the template variable "typecomment":
    Window>Preferences>Java>Templates.
    To enable and disable the creation of type comments go to
    Window>Preferences>Java>Code Generation.
*/
    public class PasswordKeeper extends JFrame implements ActionListener {
private javax.swing.JPanel jContentPane = null;
private javax.swing.JLabel jLblKey = null;
```

APPENDIX A-continued

```
    private javax.swing.JTextField jTxtKey = null;
    private javax.swing.JLabel jLblApp = null;
    private javax.swing.JButton jBtnPwd = null;
    private javax.swing.JTextField jTxtPwd = null;
    private javax.swing.JButton jBtnID = null;
    private javax.swing.JTextField jTxtID = null;
    private javax.swing.JTextField jTxtApp = null;
    /**
      This method initializes
     *
     */
        public PasswordKeeper( ) {
    super( );
    initialize( );
        }
        public static void main(String[ ] args) {
        try {
UIManager.setLookAndFeel(
        UIManager.getCrossPlatformLookAndFeelClassName( ));
        } catch (Exception e) { }
        PasswordKeeper pwdkpr = new PasswordKeeper( );
    //Finish setting up the frame, and show it.
    pwdkpr.addWindowListener(new WindowAdapter( ) {
        public void windowClosing(WindowEvent e) {
        System.exit(0);
        }
    });
    }
    /**
      This method initializes this
     *
     @return void
     */
        private void initialize( ) {
    this.setContentPane(getJContentPane( ));
    this.setSize(407, 222);
    this.setTitle("Password Keeper");
    this.setVisible(true);
    this.setLocation(200, 200);
        }
    /**
      This method initializes jContentPane
     *
     @return javax.swing.JPanel
     */
        private javax.swing.JPanel getJContentPane( ) {
if(jContentPane == null) {
    jContentPane = new javax.swing.JPanel( );
    jContentPane.setLayout(null);
    jContentPane.add(getJLblKey( ), null);
    jContentPane.add(getJTxtKey( ), null);
    jContentPane.add(getJLblApp( ), null);
    jContentPane.add(getJTxtApp( ), null);
    jContentPane.add(getJBtnPwd( ), null);
    jContentPane.add(getJTxtPwd( ), null);
    jContentPane.add(getJBtnID( ), null);
    jContentPane.add(getJTxtID( ), null);
        }
        return jContentPane;
    }
    /**
      This method initializes jLblKey
     *
     @return javax.swing.JLabel
     */
        private javax.swing.JLabel getJLblKey( ) {
        if(jLblKey == null) {
    jLblKey = new javax.swing.JLabel( );
    jLblKey.setSize(60, 15);
    jLblKey.setText("Key:");
    jLblKey.setLocation(26, 28);
        }
        return jLblKey;
    }
    /**
      This method initializes jTxtKey
     *
     @return javax.swing.JTextField
     */
```

APPENDIX A-continued

```
        private javax.swing.JTextField getJTxtKey( ) {
if(jTxtKey == null) {
    jTxtKey = new javax.swing.JTextField( );
    jTxtKey.setSize(280, 15);
    jTxtKey.setLocation(100, 28);
    jTxtKey.setToolTipText("Your Key.");
        }
        return jTxtKey;
    }
    /**
     This method initializes jLblApp
     *
     @return javax.swing.JLabel
     */
        private javax.swing.JLabel getJLblApp( ) {
        if(jLblApp == null) {
jLblApp = new javax.swing.JLabel( );
jLblApp.setSize(60, 15);
jLblApp.setText("App/URL:");
jLblApp.setLocation(26, 54);
        }
        return jLblApp;
    }
    /**
     This method initializes jBtnPwd
     *
     @return javax.swing.JButton
     */
        private javax.swing.JButton getJBtnPwd( ) {
        if(jBtnPwd == null) {
jBtnPwd = new javax.swing.JButton( );
jBtnPwd.setSize(70, 20);
jBtnPwd.setLocation(26, 110);
        jBtnPwd.setToolTipText("Generate Password for Application/Web Page.");
        jBtnPwd.setText("Password");
        jBtnPwd.setMargin(new java.awt.Insets(2,2,2,2));
        jBtnPwd.addActionListener(this);
        }
        return jBtnPwd;
    }
    /**
     This method initializes jTxtPwd
     *
     @return javax.swing.JTextField
     */
        private javax.swing.JTextField getJTxtPwd( ) {
if(jTxtPwd == null) {
    jTxtPwd = new javax.swing.JTextField( );
    jTxtPwd.setSize(280, 20);
    jTxtPwd.setLocation(100, 110);
        }
        return jTxtPwd;
    }
    /**
     This method initializes jBtnID
     *
     @return javax.swing.JButton
     */
        private javax.swing.JButton getJBtnID( ) {
        if(jBtnID == null) {
jBtnID = new javax.swing.JButton( );
jBtnID.setSize(70, 20);
jBtnID.setLocation(26, 145);
        jBtnID.setToolTipText("Generate User ID for Application/Web Page.");
        jBtnID.setText("User ID");
        jBtnID.setMargin(new java.awt.Insets(2,2,2,2));
        jBtnID.addActionListener(this);
        }
        return jBtnID;
    }
    /**
     This method initializes jTxtID
     *
     @return javax.swing.JTextField
     */
        private javax.swing.JTextField getJTxtID( ) {
        if(jTxtID == null) {
jTxtID = new javax.swing.JTextField( );
jTxtID.setSize(280, 20);
```

APPENDIX A-continued

```
    jTxtID.setLocation(100, 145);
        }
        return jTxtID;
    }
    /**
     This method initializes jTxtApp
    *
    @return javax.swing.JTextField
    */
        private javax.swing.JTextField getJTxtApp( ) {
if(jTxtApp == null) {
    jTxtApp = new javax.swing.JTextField( );
    jTxtApp.setSize(280, 15);
    jTxtApp.setLocation(100, 54);
        }
        return jTxtApp;
    }
        /** Processes the buttons. */
    public void actionPerformed(ActionEvent e) {
    Key mykey = new Key(jTxtKey.getText( ));
    if (e.getActionCommand( ).equals("Password")) {
        jTxtPwd.setText(myKey.password(jTxtApp.getText( )));
} else if (e.getActionCommand( ).equals("User ID")) {
        jTxtID.setText(myKey.userid(jTxtApp.getText( )));
        }
    }
        } // @jve:visual-info decl-index=0 visual-constraint="1,22"
```

I claim:

1. A method of generating a password for at least one application using a single key, said method comprising the steps of:

receiving said single key by a password generator;

receiving a first application name by the password generator at a first time, wherein the first application name is associated with a first application;

receiving a first user selection specifying that no time period applies in the generating of a password by the password generator;

generating a first instance of a first password for said first application by the password generator, wherein the generating of the first instance of the first password is based on at least said first application name received at the first time and based on said single key;

receiving said first application name again by the password generator at a second time;

receiving a second user selection after the second time specifying that no time period applies in the generating of a password by the password generator;

generating a second instance of the first password for said first application by the password generator, wherein the generating of the second instance of the first password is based on at least said first application name received at the second time and based on said single key, and the generated first password is identical in its first and second instances;

receiving said first application name again by the password generator at a third time;

receiving a third user selection after the third time specifying that a first time period applies in the generating of a password by the password generator;

receiving a user specification of the first time period; and generating a third instance of the first password for said first application by the password generator, wherein the generating of the third instance of the first password is based on at least said first application name received at the third time and based on said single key, wherein if the third time is after the second time by less than the specified first time period the generated first password is identical in its first, second and third instances.

2. The method according to claim 1, comprising the further steps of:

receiving a second application name by the password generator at a fourth time, wherein the second application name is different than the first application name and is associated with a second application;

generating a first instance of a second password for said second application by the password generator, wherein the generating of the first instance of the second password is based on said second application name received at the third time and based on said single key, wherein the second password is different than the first password;

receiving said second application name again at a fourth time by the password generator;

receiving a fourth user selection after the fourth time specifying that no time period applies in the generating of a password by the password generator;

generating a second instance of the second password for said second application by the password generator, wherein the generating of the second instance of the second password is based on at least said second application name received at the fourth time and based on said single key and the generated second password is identical in its first and second instances;

receiving said first application name again by the password generator at a fifth time;

receiving a fifth user selection after the fifth time specifying that a second time period applies in the generating of a password by the password generator;

receiving a user specification of the second time period; and generating a third instance of the second password for said second application by the password generator, wherein the generating of the third instance of the second password is based on at least said second application name received at the fifth time and based on said single key, wherein if the fifth time is after the fourth time by more than the specified second time period the generated second password is different in its third instance than in its first and second instances.

3. The method according to claim 1, comprising the further steps of:
   receiving said first application name again by the password generator at a fourth time;
   receiving a fourth user selection after the fourth time specifying that a second time period applies in the generating of a password by the password generator;
   receiving a user specification of the second time period; and
   generating a fourth instance of the first password for said first application by the password generator, wherein the generating of the fourth instance of the first password is based on at least said first application name received at the fourth time and based on said single key, wherein the fourth time is after the third time by more than the specified second time period, so that the fourth instance of the generated first password is different than at least its first and second instances.

4. The method according to claim 1, wherein generating said first password utilises at least one encryption technique selected from the group of encryption techniques consisting of Block Addition, International Data Encryption Algorithm (IDEA), BLOWFISH, Software-optimized Encryption Algorithm (SEAL), RC4, Data Encryption Standard (DES), and RSA.

5. The method according to claim 1, comprising the further step of:
   generating a first userid for said first application, based on at least said single key and said first application name.

6. The method according to claim 5, comprising the further step of:
   receiving a first userid time period;
   wherein generating said first userid is further based on said first userid time period.

7. The method according to claim 5, comprising the further step of:
   receiving first userid constraints for said first userid;
   wherein generating said first password is further based on said first userid constraints.

8. The method according to claim 5, wherein generating said first userid utilises at least one encryption technique selected from the group of encryption techniques consisting of Block Addition, International Data Encryption Algorithm (IDEA), BLOWFISH, Software-optimized Encryption Algorithm (SEAL), RC4, Data Encryption Standard (DES), and RSA.

9. The method according to claim 1, wherein said first application is selected from the group of applications consisting of bank account, Internet email account, Internet website, and computer account.

* * * * *